Nov. 17, 1959 N. GUARDIOLA 2,913,606
FIELD WINDING FOR DYNAMOELECTRIC MACHINE
Filed July 16, 1957 2 Sheets-Sheet 1

WITNESSES
Edwin E. Bassler
E. Herbert Liss

INVENTOR
Nicolas Guardiola
BY
ATTORNEY

United States Patent Office 2,913,606
Patented Nov. 17, 1959

2,913,606
FIELD WINDING FOR DYNAMOELECTRIC MACHINE

Nicolas Guardiola, Lima, Ohio, assignor to Westinghouse Electric Corporation, East Pittsburgh, Pa., a corporation of Pennsylvania Application July 16, 1957, Serial No. 672,316

6 Claims. (Cl. 310—180)

The present invention relates to field windings for dynamoelectric machines and more particularly to field coils for alternating current generators of the rotating field type.

The field coils of salient pole dynamoelectric machines usually consist of copper strap conductors wound edgewise. A known means to improve the ventilation of such coils is to extend some of the turns beyond the others at the end of the coils to serve as cooling fins. This is readily done by making these extended turns longer than the others in the direction of the longitudinal axis of the pole piece when the coil is wound. This arrangement provides some degree of cooling under ordinary operating conditions. In many cases, such field coils consist of a relatively large number of turns and only every third or fourth turn is extended so as to provide sufficient spacing between the extended turns to permit an adequate flow of ventilating air between them.

In compound machines where inner and outer concentric coils are mounted on a single pole, it is the usual procedure to allow an air space between the inner and outer coil by making the outer coil longer. A wedge is required to keep the coils apart.

In some types of dynamoelectric machines and under certain conditions, however, such as aircraft generators designed for extreme altitude conditions, the ventilation of such coils poses a more difficult problem. In such applications even if every other turn is extended as a cooling fin, there is still insufficient ventilating surface to compensate for the decrease in mass air flow at high altitudes.

To provide radial space between the inner and outer coils of a pair of concentric coils is not an adequate solution to the ventilation problems existing at high altitudes where mass air flow is reduced and the velocity of the air is increased. In such an arrangement the high velocity air movement cannot follow the tortuous air flow path of this type of coil. The high velocity of the air will cause it to travel through the space of least resistance such as the openings through the stator and the openings between the poles. On aircraft rotating units which are fan cooled, blast air cooled, or a combination of both, the high temperature of the rotor winding is critical, and is frequently the limiting factor in the design. The high altitudes for which such equipment is designed creates a cooling problem since the mass air flow is reduced and the velocity of the air increased at high altitude.

The weight of the generator is another important factor to be considered in many applications including use in aircraft. The maximum electrical output that can be supplied by a generator for a minimum weight depends to a large extent upon the maximum heating that can be sustained continuously in the field. Improved ventilation of the field coils, therefore, results in a reduction in weight of the generator per kva. inasmuch as the amperes per field turn can be increased with the improved cooling of the machine.

The principal object of the present invention is to provide a field winding for a salient pole dynamoelectric machine which is constructed in a manner to provide effective cooling of the winding with substantially no increase in the dimensions of the coil.

Another object of the invention is to provide a dynamoelectric machine of less weight per kva. than conventional dynamoelectric machines by reason of a novel construction and arrangement of the field winding which results in improved cooling and ventilation of the coil.

Other objects and advantages of the invention will be apparent from the following detailed description, taken in connection with the accompanying drawings, in which.

Figure 1:
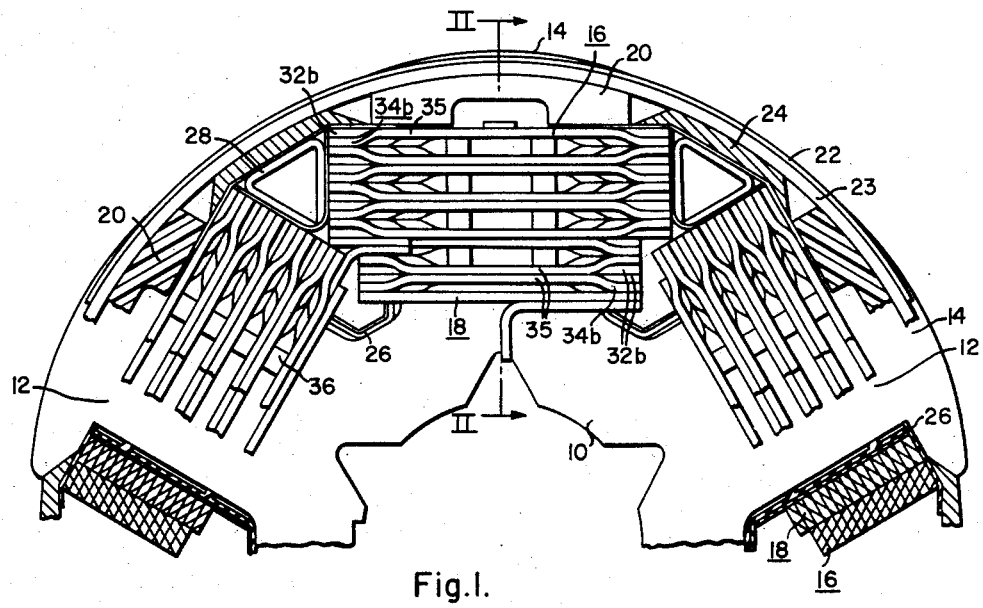
Figure 1 is a fragmentary end view of a portion of the rotor showing the end portions of the field windings of this invention.

In Fig. 1 there is shown a portion of an annular field core 10 of a rotating field dynamoelectric machine which may be considered as an alternating current generator. The annular core 10 is mounted in a conventional manner on the driving shaft (not shown) of the machine. Spaced about the periphery of the annular core 10 are a plurality of projecting field poles 12 with a radially outer pole face 14 suitably formed and disposed for cooperation with the inner periphery of a conventional stationary armature (not shown) of a machine of this type. The annular core 10 and its associated field poles 12 are preferably of the laminated type. The field pole 12 is provided with concentric outer and inner coils 16 and 18 which may be series and shunt coils, respectively. Each of the field poles 12 have radially outer pole faces 14 extending to the sides of the poles. The field coils 16 and 18 are maintained and supported in position on the field pole by means of an annular core 10 and coil support members 20 held in place by a banding ring 22. Inserted in the space between adjacent pole faces 14 are wedges 24 which aid in properly securing the field coils in position. A damper ring 23 is secured about the circumference of the rotor between banding ring 22 and the pole faces. Coil spacers 26 lie between the sides of the inner coils 18 and the sides of a pole to provide air space between the side of the pole and the coil. Other spacers 28 lie between adjacent outer coils 16 to provide air passages between the coils.

Figure 2:
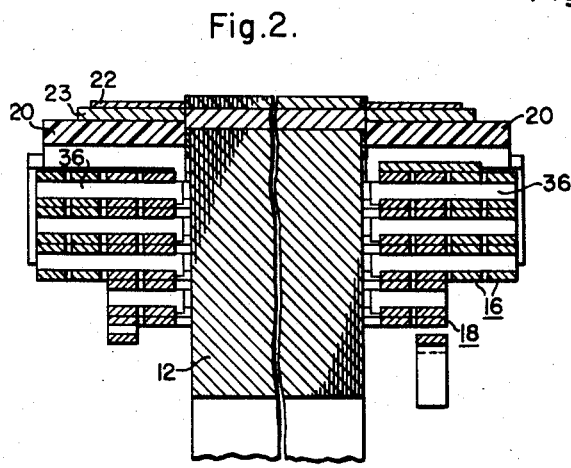
Fig. 2 is a sectional view of a rotor pole taken on line II—II of Fig. 1.
Figure 3:
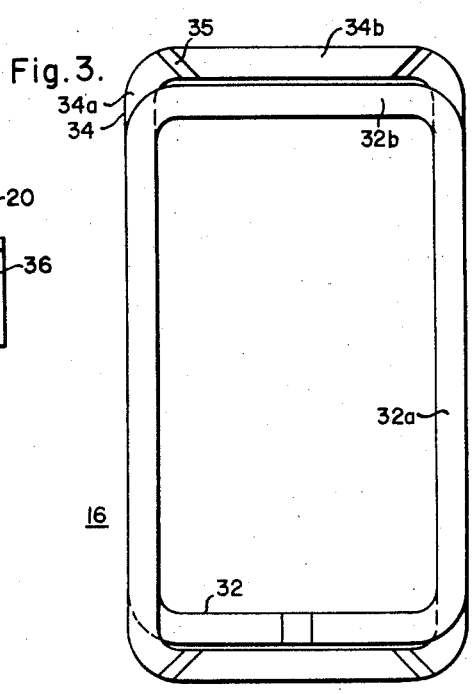
Fig. 3 is a top elevation of a coil constructed in accordance with this invention.
Figure 4:
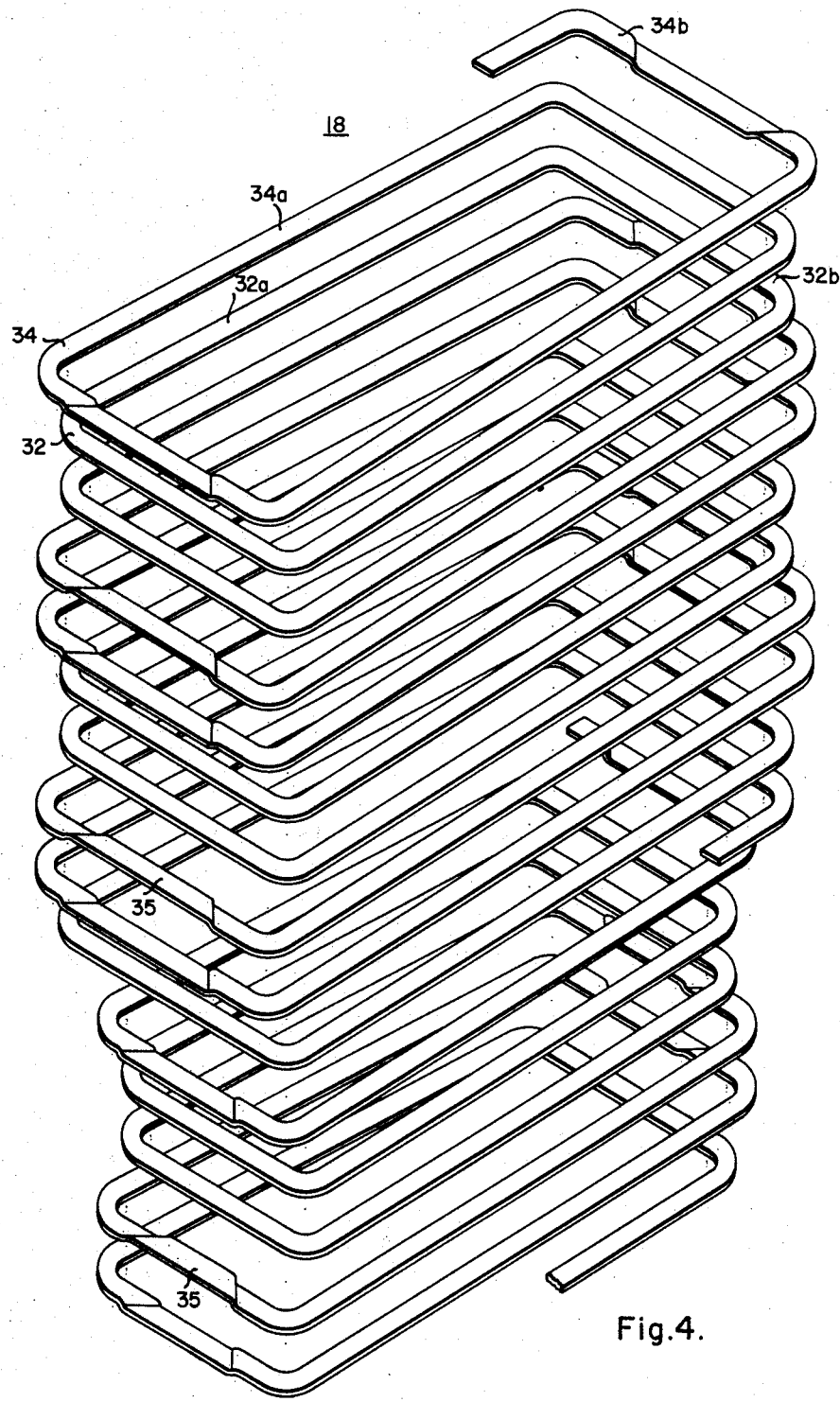
Fig. 4 is an exploded perspective view of a field coil constructed in accordance with this invention.

The field coils 16 and 18, shown in the drawings, are of insulated strap conductor each formed by winding the conductor edgewise to the desired outline shape of the coil. The coils may be of any desired shape or dimensions and the conductor may be wire of any desired cross section. As shown more clearly in Fig. 4, each of the coils 16 and 18 consist of a plurality of short turns 32 and extended turns 34 of conductor strap wound edgewise to form a multi-turn coil shown as a rectangular helix. The coils are wound so that the flat faces of one turn lie opposite the flat faces of the next adjacent turn. Each short turn 32 has side portions 32a and end portions 32b. Each extended turn has side portions 34a and end portions 34b. The side portions 34a of the extended turns 34 are longer than the side portion 32a of short turns 32 at each end by a distance equal to at least the width of the conductor. Thus, the end portions 34b extend outwardly of the end portions 32b. A pair of extended turns 34 alternate with a pair of short turns 32 in the preferred embodiment illustrated. Each end portion 34b, or a portion thereof, of extended turn 34, is offset toward the next adjacent short turn, a distance approximately equal to the thickness of the conductor as shown at 35, Fig. 4. It will now be seen that an air space extending from the inside of the inner turns to the outside of the extended turns is formed and is twice the width of the conductor. Thus, the outer edges of the extended turns and one flat side of each short and extended turn is exposed directly to the cooling air at the ends of the coil. To avoid closure of the air spaces at the ends of the coils due to compression of the coil, spacers 36, Fig. 2, are inserted in the spaces between the end turns.

This increase in exposed coil surface is accomplished without increasing the overall space occupied by the coil in position on the pole by reason of the unique arrangement of the windings herein disclosed. In a conventional coil a spacer would be required between the inner edges of the end of the inner coil and the pole which would result on a coil of the same length as the one described above. In the present construction, this spacer may be eliminated, since the spacing of the turns achieved by the novel construction provides exposed surface along the end surface of the pole.

Only one coil has been described. Both inner and outer coils 18 and 16 are of identical construction but outer coil 16 is of larger overall dimensions in order that it may be mounted concentric with the inner coil. The air spaces of the inner and outer coils are aligned with each other so that air can pass from the outer edge of the outer coil to the pole face over the flat surfaces of both coils. This alignment of the coils renders it unnecessary to provide air space between outer coil 16 and inner coil 18.

While the coil illustrated and described herein is of rectangular shape, it will be obvious that this invention can be applied to a coil of any shape so long as portions of certain of the turns are extended beyond corresponding portions of other turns and the extended portions are offset toward the next adjacent turn. It will also be obvious that any number of short turns may intervene between the extended turns although maximum surface exposure is obtained by the preferred embodiment herein described and illustrated. It is also obvious that the conductor need not necessarily be flat strap wire of rectangular cross section but may be round, square or any desired cross section.

It will be seen that a construction has been provided in which effective cooling of the field coils of a salient pole dynamoelectric machine is obtained. This improvement in cooling makes it possible to use a minimum number of turns, and thus, a minimum radial length of the pole piece so that a very considerable saving in the amount of copper required is effected and a substantial reduction in the cost, dimensions and weight of the machine results.

A preferred embodiment of the invention has been shown and described for the purpose of illustration, but it will be obvious that various modifications may be made within the scope of the invention, and it is therefore to be understood that the invention is not limited to the specific arrangements shown, but in its broadest aspects it includes all equivalent embodiments and modifications which come within the scope of the invention.

I claim as my invention:

1. A coil for a dynamoelectric machine comprising a plurality of turns of conducting wire, some of said turns having a section extending beyond other of said turns, a pair of said extended turns alternating with a plurality of said other turns, each of said extended turns having the inner edges of said extended sections spaced outwardly from the inner edge of the coil a distance equal to at least the width of said other turns and having a portion of said extended section offset toward one of said other turns.

2. A coil for a dynamoelectric machine comprising a plurality of turns of conducting strap wire wound edgewise so that the flat surfaces of the strap wire are adjacent to each other, some of said turns being extended beyond other of said turns, a pair of said extended turns alternating with a plurality of said other turns, each of said extended turns having a portion offset toward one of said other turns, next adjacent, whereby air cooling passages are provided to expose the flat surfaces of the end portions of said extended turns and the flat surfaces of the end portions of said other turns, next adjacent, to the cooling air.

3. In a dynamoelectric machine, a salient pole rotor including a pole piece and a coil on said pole piece, said coil comprising a plurality of turns of conducting strap wire wound edgewise into a continuous substantially rectangular helix, some of said turns being extended beyond other of said turns at the ends of the coil, said extended turns having the inner edges of their extended ends spaced from said pole a distance equal to at least the width of said other turns and having a substantial portion of their extended ends offset toward one of said other turns, next adjacent, whereby air cooling passages are provided to expose the flat surfaces of the end portions of said extended turns and the flat surfaces of the end portions of said other turns, next adjacent, to the cooling air.

4. In a dynamoelectric machine, a salient pole rotor including a pole piece and a coil on said pole piece, said coil comprising a plurality of turns of conducting strap wire wound edgewise into a continuous, substantially rectangular helix, some of said turns being extended beyond other of said turns at the ends of the coil, a pair of said extended turns alternating with a plurality of said other turns, said extended turns having a substantial portion of their extended ends offset toward one of said other turns, next adjacent, whereby air cooling passages are provided to expose the flat surfaces of the end portions of said extended turns and the flat surfaces of the end portions of said other turns, next adjacent, to the cooling air.

5. In a dynamoelectric machine, a salient pole rotor including a pole piece and a coil on said pole piece, said coil comprising a plurality of turns of flat strap conductor wound edgewise into a continuous substantially rectangular helix, some of said turns being extended beyond other of said turns at the ends of the coil, a pair of said extended turns alternating with a pair of said other turns, alternate ones of said extended turns having a substantial portion of their extended ends offset downwardly to be in the plane of the next adjacent other turn, the other of said extended turns having a substantial portion of their extended ends offset upwardly to be in the plane of the next adjacent other turn, whereby air cooling passages are provided to expose the other turns to the cooling air.

6. In a dynamoelectric machine, a salient pole rotor including a pole piece, inner coil on said pole piece and an outer coil on said pole piece concentric with said inner coil, each of said inner and outer coils comprising a plurality of turns of flat strap conductor wound edgewise into a continuous, substantially rectangular helix, some of said turns being extended beyond other of said turns at the ends of the coil, a pair of said extended turns alternating with a pair of said other turns, alternate ones of said extended turns having a substantial portion of their extended ends offset downwardly to be in the plane of the next adjacent other turn, the other of said extended turns having a substantial portion of their extended ends offset upwardly to be in the plane of the next adjacent other turn, said offset ends providing air cooling passages between said extended turns, said passages of said inner and outer coils being in alignment, whereby the flat sides of said extended turns and said other turns of said inner and outer coils are exposed to cooling air.

References Cited in the file of this patent

UNITED STATES PATENTS 2,756,358    Johnson _____ July 24, 1956

FOREIGN PATENTS 889,649    Germany _____ Sept. 14, 1953